United States Patent [19]

Dietrich, Sr.

[11] 4,454,920
[45] Jun. 19, 1984

[54] HIGH SPEED TILLAGE SYSTEM WITH DISCS AND PLOW POINTS

[75] Inventor: William J. Dietrich, Sr., Congerville, Ill.

[73] Assignee: DMI, Inc., Goodfield, Ill.

[21] Appl. No.: 373,897

[22] Filed: May 3, 1982

Related U.S. Application Data

[62] Division of Ser. No. 150,730, May 19, 1980, abandoned.

[51] Int. Cl.³ .................... A01B 49/02; A01B 63/32
[52] U.S. Cl. .................................. 172/464; 172/484; 172/316; 172/454; 172/138
[58] Field of Search ............... 172/464, 470, 491, 468, 172/301, 302, 413, 484, 826, 780, 310, 140, 138, 142, 139, 291, 629, 630, 315, 196, 316, 471, 469, 785, 454, 455

[56] References Cited

U.S. PATENT DOCUMENTS

| | | | |
|---|---|---|---|
| 525,424 | 9/1894 | Lindestrom | 172/139 |
| 1,557,109 | 10/1925 | Vandeberg | 172/603 |
| 1,674,779 | 6/1928 | Heitmeyer | 172/166 |
| 1,759,647 | 5/1930 | Kincannon | 172/469 |
| 2,523,421 | 9/1950 | Buschor | 172/142 X |
| 2,546,461 | 3/1951 | Lewis | 172/491 |
| 2,925,871 | 2/1960 | Gillette | 172/302 X |
| 3,486,761 | 12/1969 | Fay | 172/316 |
| 3,627,053 | 12/1971 | Hook | 172/316 |
| 3,757,871 | 9/1973 | Maust | 172/178 |
| 3,774,696 | 11/1973 | Horsch | 172/816 |
| 4,186,805 | 2/1980 | Repski | 172/310 |
| 4,313,503 | 2/1982 | Good | 172/140 |

FOREIGN PATENT DOCUMENTS

987717  4/1951  France ......................... 172/138

Primary Examiner—Richard J. Johnson
Attorney, Agent, or Firm—Emrich, Lee, Brown & Hill

[57] ABSTRACT

A tillage system includes forward and rear sets of widely spaced discs and a set of plow points. The discs in the forward set are mounted at spaced intervals so as to leave alternate strips of worked and unworked soil of substantially equal width. Each disc of the rear set is mounted in a strip of soil left unworked by the forward set to complete the working of the top soil. The plow points are located in the furrows of one of the sets of discs (preferably the rear set) to permit some deep plowing. The working depths of the points and discs are independently adjustable. The system is designed for operation at high speed to provide complete coverage of the soil with minimal double working by the discs. It permits deeper penetration by the discs and a controlled amount of deeper plowing by the points while leaving a finished contour which is substantially free of ridges and furrows.

8 Claims, 7 Drawing Figures

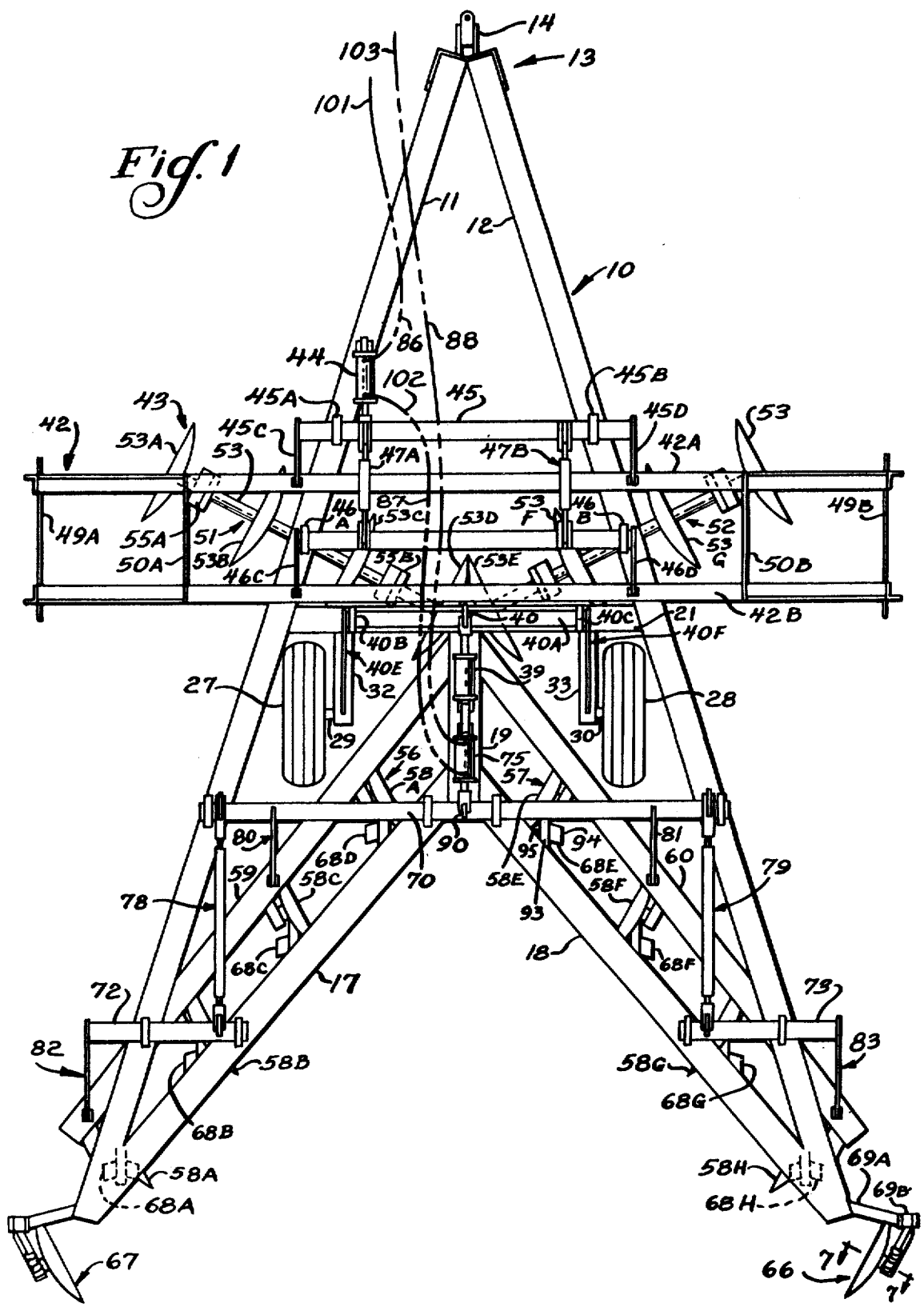

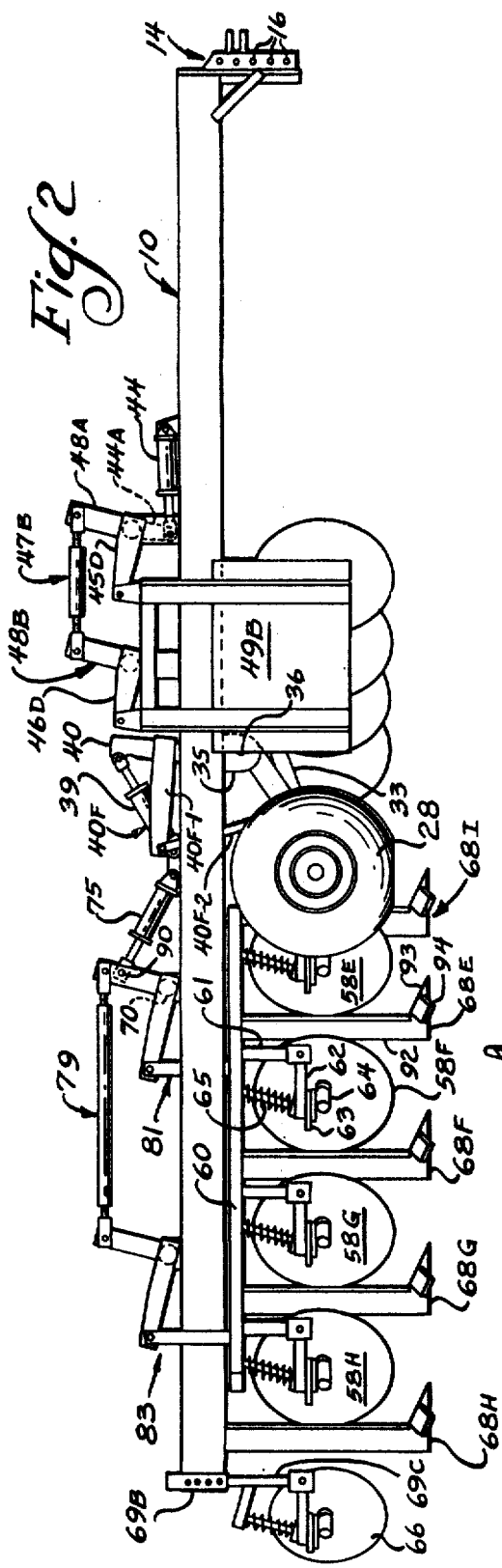
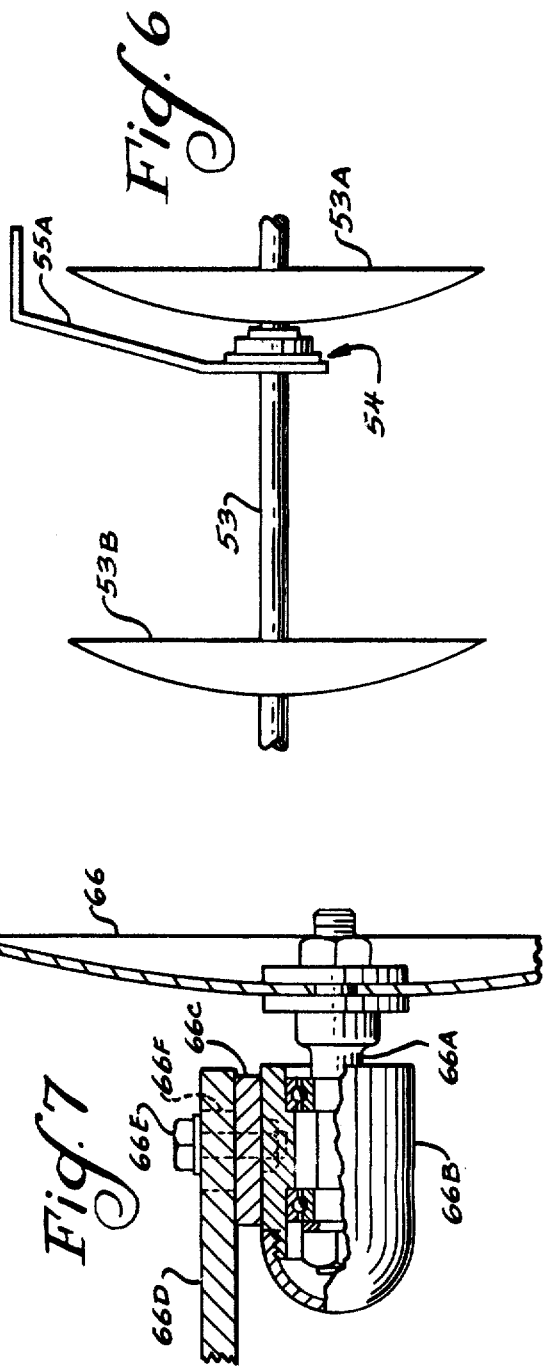

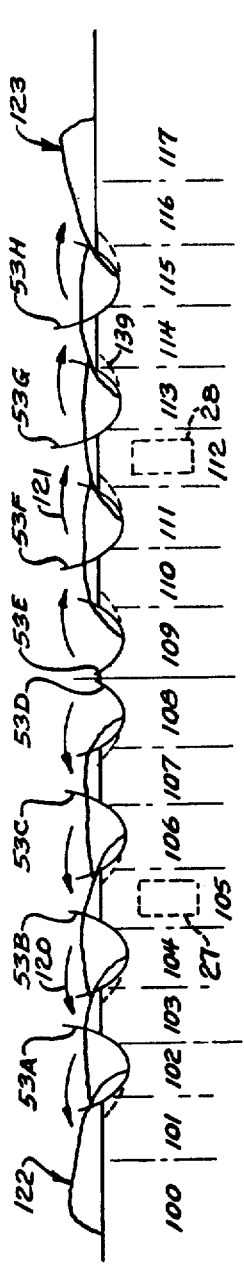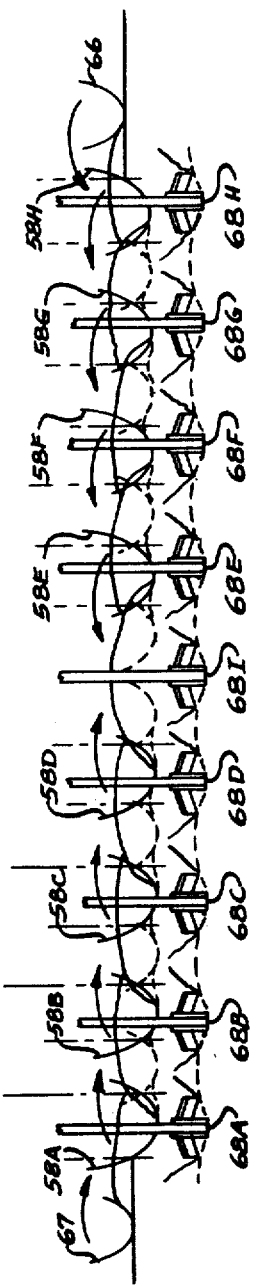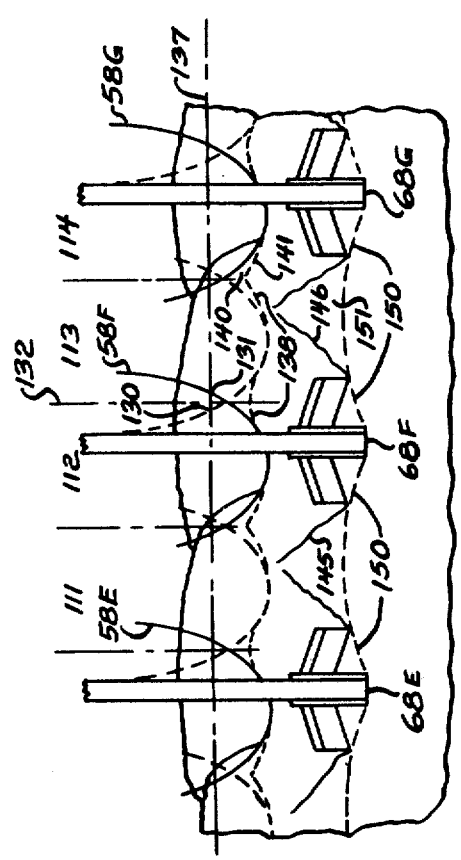

HIGH SPEED TILLAGE SYSTEM WITH DISCS AND PLOW POINTS

This is a division of application Ser. No. 06/150,730, filed on May 19, 1980, now abandoned.

BACKGROUND AND SUMMARY

The present invention relates to agricultural tillage apparatus; and more particularly, it relates to apparatus which may be used for primary tillage at relatively high ground speeds (in the range of 4½ to 8 mph). The invention uses a combination of discs and plow points which accomplishes complete tillage in one pass without double-working of the soil by the discs and performs some deep soil breaking with the points, but which is especially adapted to leave the surface of the soil relatively even and without deep furrows and to avoid creating a plow sole.

Perhaps the most commonly used tool for plowing is the conventional moldboard plow. Usually the plow bottom is set at a particular depth of plowing, for example eight or ten inches. Moldboard plows typically are mounted to a main beam which is inclined relative to the direction of travel of a tractor so that each moldboard is set to take a swath or strip of ground which typically may be 12-16 inches wide or more, cut it into a slab or large chunks (clods), and roll the ground over into a furrow formed by the next forward moldboard. The leading moldboard turns its strip of ground (usually in the form of a slab) over into a furrow formed on a previous pass of the plow system.

When a moldboard plow is used repeatedly to plow ground at the same depth, a layer of highly compacted soil is formed just beneath the worked soil. This is called the plow "sole", and it has the disadvantage that, due to its compactness, roots of plants have difficulty in penetrating it; and due to its relative flatness, water has a tendency to drain over the plow sole rather than being absorbed by the soil. A moldboard plow displaces to one side all of the soil that is tilled, leaving deep furrows on the surface.

Each adjacent swath is worked in the same direction. That is, a farmer cannot till a strip one direction, turn around and till the adjacent strip in the opposite direction. He must always have the untilled soil to the same side. Eventually, the soil must be plowd in the opposite direction, and even when this occurs, a deep side ridge normally is left at the end strip.

It is desirable to plow deep soil in large slabs or clods, particularly during the fall because over the winter, water will be absorbed in the fissures and interstices thus formed; and the freezing and thawing over the winter will make the soil more mellow in the spring, and thereby facilitate the preparation of seed beds. However, there are some areass such as rolling fields where it is not desirable to leave the deep surface furrows left by a moldboard plow which have a tendency to cause runoff of surface water which erodes top soil and prevents storing the water in the subsoil which is highly desirable. There is some question as to whether the benefits of such deep turning of all the subsoil are worth the extra energy necessary to accomplish it.

In the case where moldboard plows are used for tilling soil which has not previously been cleared, and may contain some "trash" (that is, crop residue which, in the case of corn, may be bulky and tough), a coulter is usually located in front of each moldboard plow to cut through the trash and at least partly through the soil. This reduces accumulation of trash on the leading edge of the moldboard, and it further assists the moldboard by cutting the soil. Coulters are also used in connection with other tillage systems, and they generally are in the form of a relatively flat, circular blade mounted to rotate about an axis transverse of the direction of travel.

Another form of blade that is used in tillage systems is referred to as a "disc", and it takes the shape of a spherical or frusto-conical dish or bowl. They are found primarily in disc harrows, in which the discs are used both for cutting trash and for throwing some of the top soil to the side. Typically, a plurality of disc blades are arranged at a relatively close spacing, and they may be mounted or ganged on a common shaft which extends at an acute angle relative to a line transverse of the direction of travel of the tractor (called the "working angle"). When a gang of disc blades is pulled across a field, complete soil coverage is obtained. That is, all of the soil is tilled, the trash is cut up, mixed with the top soil and some trash is buried. Complete coverage is obtained because the spacing of adjacent discs is typically about forty percent of the diameter of a disc, and the discs are turned slightly to work a path.

In these devices, to reduce the effect of lateral soil displacement due to complete workage, a second line or gang of discs, facing the other direction, may be placed behind a first line.

In one conventional arrangement, each line or gang is formed in a chevron shape. The "V" of the forward line may open toward the front, and the rear line may open toward the rear. This is called a "tandem" arrangement; and both sets of discs are symmetrical about the center line of the system. Another common form of disc harrow, called an "offset" arrangement, has all the discs in the forward gang mounted on a common shaft and facing one lateral direction, and all the discs in the rear gang similarly mounted and facing the other lateral direction. In all such cases, however, the effect is that each disc gang works all of the soil, rather than selected strips, since the primary purpose of the disc is to cut and bury the trash. One disadvantage of a double-working system in addition to the additional horsepower required, is that the rear gang further pulverizes the soil; and this tendency increases with speed. If a farmer then tills the disced land with a chisel plow for deeper working of the soil, the chisel plow also has the effect of digging up the buried trash, and bringing the trash back to the surface.

There is also a plow which uses larger blades (commonly 24-26 inches in diameter) with only one line or gang. The blades are spaced at a distance of about 40% of the diameter of the blades, as with disc gangs. This type of device is referred to as a "one way" tiller because adjacent strips of soil must be worked in the same direction (like a moldboard plow) since the soil is displayed laterally. Because one-ways are used for tillage, with a working angle of about 45°, there is a substantial lateral draft when they are used, making them difficult to adjust, particularly in varying soil conditions.

All of the systems mentioned above which employ discs for tillage, as mentioned, normally suggest a lateral spacing of the discs (i.e., the distance between corresponding points on adjacent blades taken along the axis of rotation) which is about 40 percent of the diameter of the blade, although it may range from 30 percent up to 50 percent in an unusual case. With this spacing, when the discs are set at a normal working angle and depth, all of the soil is worked by each set of blades, as mentioned. This spacing has the effect that under conditions of heavy trash or muck or both, the space between blades will become clogged with trash which will accumulate and eventually be left in a large clump. Most such systems are equipped with scraper blades for the discs because the soil and trash became wedged between adjacent blades due to the close spacing.

The large number and closeness of discs in these systems also reduces the weight per disc for a given machine weight, and, therefore, limits penetration of the discs.

Other agricultural implements use disc blades, such as listers and bedders, but the function of the disc blades in these implements is to create raised beds for seeds, with lateral troughs on the top of the soil for wate collection or irrigation.

The present invention is directed to apparatus for primary tillage. That is, it turns up at least some soil at a depth below 3-4 inches (up to about 15 inches), buries a certain amount of trash, and breaks the soil to a depth in the range of 7-15 inches.

A plurality of discs are mounted in a forward set at widely spaced intervals so as to leave alternate strips of worked and unworked soil. By "widely spaced" it is meant that the spacing of the discs along their axis of rotation is greater than 70 percent (about 80 percent in a preferred embodiment) of the diameter of the disc. Preferably, larger discs are used because the apparatus is intended for primary tillage. That is, discs having a diameter in the range of 24-36 inches are preferred. By widely spacing the discs, and arranging the working angle of the discs to be in the range of 25°-30°, and preferably about 27°, the width of the strips of soil left untilled by the first plurality of discs is substantially equal to the width of the tilled strips.

A second plurality of discs forms a rear set behind the forward set. Each disc of the second set is mounted in a strip of soil left untilled by the first set to complete the working of the top soil in a single pass without re-working any substantial amount of the soil already worked.

A plow tip or point is located immediately behind each of the discs of the second set to break soil at a deeper depth than the associated disc. The plow points may be conventional chisel points or they may be provided with laterally extending wings if it is desired to bring up more deep soil. The discs may be set, for example, to work at a depth of 4-5 inches); and the points may be set to work at a 12 inch depth.

When operating at high speed in the range of 4½ to 8 mph, each disc of the forward set dips top soil and trash, and throws it laterally. Most of the material is thrown into the furrow formed by the next forward discs, thereby filling that furrow. A dirt shield is located adjacent the leading disc to windrow the soil displaced by it on the adjacent strip of unworked soil. Thus, between adjacent strips of ground worked by the discs of the first set, there are strips of unworked soil. Some soil and trash will accumulate on these previously unworked strips, due to the tilling action of the forward set of discs.

Each disc of the rear set similarly digs top soil and trash, and throws it laterally. But each of the rear discs is immediately followed by a plow point which digs up some soil from a depth deeper than the working depth of the discs. This soil is fractured and contains larger clumps of more compacted soil. The adjacent trailing disc of the rear set then throws the mixed soil and trash which it tills into the furrow formed by the next leading disc/point pair of the rear set to cover the larger clods and tufts left by the point. Thus, the present system leaves a substantially furrowless surface. The windrows formed by the leading discs of the first set (if the first gang is arranged in a chevron form), are gathered by raker blades to cover the furrow formed by the trailing disc/point pairs of the rear set. The raker blades are mounted for independent adjustment both in height and working angle relative to the tilling discs.

In the illustrated embodiment, the plow points are mounted to a main frame which is vertically adjusted by a hydraulic ram. The working depth of the discs is independently adjustable relative to the working depth of the plow points because they ae mounted to subframes which are connected to the main frame by means of an adjusting mechanism.

The adjusting mechanism for changing the depth of the discs relative to the plow points is hydraulic and permits them to be adjusted "on the go" so that the farmer may accommodate the apparatus to varying soil conditions without stopping or even slowing his forward progress.

Because the plow points work beneath furrows formed by the second set of discs, they are able to fracture and break the subsoil into large masses without pulverizing it. This permits water to enter these large cracks and fissures and to continue to work the soil with the freezes and thaws of winter. In the spring, the soil will be soft and mellow because of this, and ready for seed bed preparation with little further working.

Further, the points bring up at least some deep soil, to reduce the problem of herbicide buildup at the surface. Because of the spacing of the plow points and their narrow lower surface, the possibility that these points will register with the exact position taken during a previous year is very small. Hence, there is no formation of plow sole from year to year.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a plan view of apparatus incorporating the present invention;

FIGS. 2 and 3 are graphic illustrations of soil profiles taken by the forward set of discs and the rear set of disc/point pairs respectively;

FIG. 4 is a close-up view of a portion of the profile shown in FIG. 3;

FIG. 5 is a right side elevation view of the apparatus of FIG. 1;

FIG. 6 is a side, fragmentary view showing the mounting of the forward set of discs; and FIG. 7 is a vertical view, partly sectional, showing the manner in which the raker blades as well as the rear blades are mounted.

DETAILED DESCRIPTION

Referring to the drawing, reference numeral 10 generall designates a main frame including first and second inclined beams 11, 12 joined at their forward end generally designated 13, at which there is provided a hitch point 14 adapted to be connected to a traction vehicle for pulling the apparatus. As seen in FIG. 2, the hitch 14 permits a verticle adjustment of the hitch point by means of the set of vertically set apertures 16.

Returning to FIG. 1, the main frame 10 also includes first and second beams 17, 18 arranged in a general chevron shape and opening toward the rear of the apparatus, similar to frame members 11, 12. The frame members 17, 18 are welded at their forward ends to a horizontal frame member 19 which extends along the centerline of the main frame. Frame members 17 and 18 are welded at their rear ends to the respective rear ends of the side frame members 11, 12. Further, a cross frame member 21 is welded to the opposing inner sides of the side frame members 11, 12 to brace them; and the forward end of the frame member 19 is welded to the center of the cross frame member 21.

The main frame is supported by first and second support wheels 27, 28, each provided with a spindle 29, 30 respectively which are mounted to arms 32, 33 respectively. The arms 32, 33 have their upper, forward ends pivotally mounted to support members depending from cross frame member 21, one such member being seen in FIG. 2 and designated by reference numeral 35, the pivotal connection being designated 36.

A hydraulic cylinder unit 39 has its rod end pivotally connected to an arm 40 which is welded to a rocker arm 40A (FIG. 1) which is mounted by means of bearings 40B, 40C to the top of cross frame member 21. The outboard end of the rocker shaft 40A includes link actuators 40E, 40F respectively, which are in turn connected to the wheel support arms 32, 33. As seen in FIG. 2, the link actuators each include a pair of links 40F-1 and 40F-2. The cylinder end of hydraulic unit 39 is pivotally mounted to the horizontal frame member 19, as seen in FIG. 1.

The hydraulic cylinder unit 39 is connected to a hydraulic power system of the tractor. When the cylinder unit is retracted, the support wheels are lowered and the frame 10 is raised relative to the ground either for road travel or for setting the working depth of the rear plow points, which are carried by main frame members 17, 18, as will be discussed.

A forward subframe generally designated 42 is vertically adjustable relative to the main frame 10 and carries a forward set of discs generally designated 43. The mechanism for vertically adjusting the forward disc frame 42 includes a hydraulic cylinder 44 having its butt end pivotally mounted to the top of the main frame member 11, and its rod end pivotally connected to a rocker shaft 45 which is mounted above the main frame by means of bearing assemblies 45A, 45B. A second rocker shaft 46 is similarly mounted to the main frame by bearing assemblies 46A and 46B; and the axes of the rocker shafts 45, 46 are parallel and transverse of the direction of travel of the apparatus. These rocker shafts are connected by means of adjustable links 47A, 47B. Each of the adjustable links 47A, 47B are similar, and include a central tubular element having reverse threads at either end thereof and receiving corresponding threaded shafts, the outboard ends of which are pivotally connected to the respective rocker shafts 45, 46 so that by turning the tubular central member in one direction the links are shortened, and by turning them in the reverse direction, the links are lengthened.

As best seen in FIG. 2 for the adjustable link 47B, its forward end is pivotally connected to a pair of ears generally designated 48A which are welded to the rock shaft 45; and its rear end is pivotally connected to a similar pair of ears 48B welded to the rock shaft 46. The links 47A, 47B thus cause the rock shafts 45, 46 to rotate in unison to lift the forward disc frame 42 while maintaining it in a horizontal plane. To accomplish this, the outboard ends of the forward rock shaft 45 are provided with a pair of crank arms 45C, 45D which are pivotally connected to a forward cross bar 42A of the frame 42; and the outboard ends of the rock shaft 46 are similarly provided with a pair of crank arms 46C, 46D, having their distal ends pivotally connected to the top of the rear cross frame member 42B of the vertically adjustable forward disc frame 42. The outboard ends of the disc shaft 42 are provided respectively with dirt shields 49A, 49B; and the frame members 42A, 42B thereof are braced by members 50A, 50B respectively.

Referring now to FIG. 2, the rod end of the hydraulic cylinder and piston rod unit 44 is pivotally connected to an arm 44A welded to the rock shaft 45 in such a manner that as the unit 44 is extended, the rock shaft 45 is caused to rotate clockwise as viewed in FIG. 2, thereby placing the adjustable links 47A, 47B in tension and similarly rotating the rock shaft 46 in a clockwise direction.

The forward set of discs 43 comprises a left gang generally designated 51 and a right gang generally designated 52. Each of these gangs is similar in structure so that only one of the disc gangs need be discussed in detail for a complete understanding of the invention.

Turning then to the left gang 51, it includes a shaft 53 with its axis horizontal and extending leftwardly and forwardly of a line transverse of the direction of travel of the apparatus. Four individual discs or blades are mounted on the shaft 53, and these are designated respectively 53A, 53B, 53C and 53D. The shaft 53, in turn, is journaled in a pair of bearing blocks (one of which is shown as 54 in FIG. 6). The bearings, in turn, are secured to the cross frame members 42A, 42B respectively of the vertically adjustable forward disc subframe 42 by brackets 55A, 55B. As will be observed in FIG. 6, the bracket 55A is mounted closer to the non-working surface of the disc 53A than it is to the working surface of disc 53B. This, together with the wide spacing of the discs, reduces trash build-up and eliminates the need for scrapers.

The right side forward disc gang 52 is similarly assembled and mounted to the vertically adjustable subframe 42. The discs on the gang 52 are designated 53E–53H respectively. The discs on the left forward gang 51 throw the soil and trash which they till toward the left; or as those on the right forward gang 52 throw the soil and trash which they till toward the right. The angle between the axis of rotation of a disc and a line transvere of the direction of travel of the apparatus defines the "working" angle of the disc.

Turning now to the rear section of the plow, it includes a rear set of discs comprising a group of four discs on the left side of the center line and generally designated 56, all of which face toward the right; and a group of four discs on the right of the center line, generally designated 57 and facing toward the left. The working angles of the discs in the rear are the same as those in the forward set; however, the discs in the rear set are not ganged together on a common shaft as with the forward set. That is, the section of discs 56 (individually designated 58A–58D) are individually mounted to a horizontally extending vertically adjustable frame 59. Similarly, the right section of blades 57 (individually designated respectively 58E–58H) are mounted to a similar frame 60. Each of the discs of the rear set may be mounted in a similar manner. Turning then to FIG. 2, for the disc 58F, a depending support member 61 is welded to the bottom of the frame 60; and a support arm 62 is pivotally connected to the bottom of the member 61 and extends rearwardly therefrom. A plate 63 is secured to the distal end of the rotatable support arm 62; and a spindle 64 of the disc 58F is mounted to the plate 63. A compression spring 65 may be mounted between the frame 60 and the support plate 62 to urge the disc downwardly, while permitting to ride over rocks or the like with independent action. Raker blades 66 and 67 are mounted for independent adjustment vertically as well as in working angle, as will be described.

It will be observed from FIG. 1 that adjacent discs of the rear set are spaced further apart longitudinally of the apparatus (that is, fore to aft) than adjacent discs of the forward set, but the lateral spacing of adjacent discs is substantially the same. For example, the axis of rotation of the disc 58C is located rearwardly of the axis of rotation of the disc 58D, whereas the axes of rotation of disc 58B and 58C of the forward set are colinear. The reason for this is that a plow point is located in the furrow immediately behind each of the discs of the rear set. Thus, plow points 68A–68D are located respectively immediately behind discs 58A–58D. These plow points are mounted to the frame member 17. Similarly, plow points 68E–68H are mounted to the frame member 18 immediately behind discs 58E–58H respectively. A forward, center plow point designated 68I in FIG. 2 is mounted beneath the main frame at the location where members 17 and 18 are joined. The reason for the spacing between adjacent discs, then, is that an adjacent rear disc throws soil into the furrow formed by the next forward disc (for example, soil tilled by disc 58C is thrown into the furrow formed by disc 58D), and if the discs had their axes aligned, some of the soil and the trash might be thrown in front of the plow point 68D and cause trash build up on the shank of the plow point.

Each of the raker blades 66, 67 is mounted for independent adjustment in height as well as in working angle. Referring to the mounting for raker blade 66, an arm 69A is welded to the rear of the main frame, and at its outboard end is mounted a vertically disposed sleeve 69B. As best seen in FIG. 2, the sleeve 69B telescopically receives a vertical member 69C on which the raker blade 66 is carried, as will be described. The sleeve 69B is provided with a plurality of vertically spaced apertures 69D, and the shaft 69C contains a transverse bore which is adapted to align with one of the apertures 69D to receive a bolt or pin for vertically adjusting the raker blade 66.

Referring now to FIG. 7, there is shown structure for mounting each of the independently-mounted discs, including discs 58A–58H as well as the raker blades 66 and 67. Thus, the disc is mounted to a spindle 66A which is rotatably mounted in a hub 66B. The hub is welded to a plate 66C which, in turn, is bolted to a bracket 66D by means of a forward and a rear bolt, the rear bolt being seen in FIG. 7 and designated 56E. The forward bolt acts as a pivot point, and the rear bolt is received in a laterally elongated slot 66F formed in the bracket. By means of this arrangement, the working angle of the disc can be independently adjusted by rotation about vertical axes. By rotating the disc to cut a wider path (i.e., increasing the working angle) more soil will be displaced laterally, and during operation, the soil and trash will be thrown further to the side than for a more shallow orientation of the blade. It is desirable to have the raker blades at a lesser working angle than the tillage discs because they throw the loose soil to a lesser extent (the width of only one strip) than do the tillage discs.

The frame members 59 and 60, as well as the rear set of discs, are vertically adjustable in unison with each other and with the forward set of discs by means of an adjusting mechanism which includes a forward rock shaft 70, side rock shafts 72, 73, and an actuating cylinder 75.

The rock shafts 70, 72 and 73 are mounted to the main frame 10 in a manner similar to that described in connection with the shaft 45, 46, which permits them to rotate about horizontal axes extending transverse of the direction of travel of the apparatus. Further, the motion of shaft 70 is transmitted to shaft 72 by means of an adjustable link 78, and to shaft 73 by means of an adjustable link 79. The adjustable links 78, 79 are also similar to those discussed above, namely, links 47A, 47B. The shaft 70 is connected to the forward portions of the frame members 59, 60 by a pair of articulated links designated respectively 80, 81; and the shafts 72, 73 are connected respectively to the rear ends of these members by similar links designated 82, 83 respectively.

Hydraulic fluid flows from a hydraulic coupler on the tractor through a hydraulic line 86 to the butt end of the cylinder 44. Fluid from the rod end of the cylinder 44 flows through a hose 87 to the rod end of cylinder 75, and fluid from the butt end of cylinder 75 returns to the tractor by means of hose 88. The rod of the cylinder 75 is pinned to a crank arm 90 extending upwardly of and welded to the center of the rotatable shaft 70 (see FIG. 2). When the cylinder 44 is extended, the forward rock shafts 45, 46, as described above, are rotated clockwise to raise the frame 42 and the forward set of discs. This forces hydraulic fluid from the rod end of the cylinder 44 into the rod end of the cylinder 75, to cause it to retract, thereby rotating the rock shaft 70 clockwise. Rotation of the shaft 70 in a clockwise direction will similarly rotate the shafts 72 and 73, via adjustable links 78, 79. Thus, the forward and rear sets of discs will be vertically adjusted relative to the main frame (and the plow points, of course) in unison. This set up of cylinders permits the use of separately acting units in a master/slave arrangement while using cylinders of the same bore size.

By mounting the forward discs such that those on one side of the center line of the apparatus have their working surfaces facing one direction and the discs on the other side of the center line have their working surfaces facing the other lateral direction, and by reversing these orientations for the rear set of discs, as in the illustrated embodiment, the lateral draft on one side of each set of blades is compensated by that on the other side, resulting in a net lateral draft which is negligible, and does not require steering or other mechanism to offset it.

Referring to FIG. 2, and particularly the plow tip 68E, each of the plow points includes a shank 92, a forward tip 93, and a pair of downardly and rearwardly swept wings 94, 95 (the latter being seen in FIG. 1). The function of each plow point is to fracture and break the soil at a depth deeper than the working depth of the discs while bringing up some of the deep soil, without throwing any substantial amount of the soil from the furrow. The design illustrated will raise more soil than a standard V-chisel tip, and if this is not desired, conventional V-chisel points may be used.

Each of the dirt shields 49A, 49B is preferably mounted for vertical adjustment, and the lower forward edge of each shield preferably is curved so as to facilitate discharge of trash or the like.

OPERATION

The discs of the forward set as well as those of the rear set are widely spaced. That is to say, those adjacent discs having their working surfaces facing the same lateral direction are spaced such that for a given working angle there is a strip of unworked soil left between them that has a width substantially equal to the width of a strip of soil worked by the blades. Another way to say this is that the spacing of corresponding points on two adjacent blades facing the same direction is greater than 70 percent of the diameter of the blade for a working angle in the range of 25°-30°; and the spacing is preferably 80 percent or greater of the diameter of the discs. It will be observed that the forward gangs of discs are arranged with their axes of rotation colinear. The axes of rotation of the discs in the rear set are not colinear for the reason mentioned. However, this lateral spacing measurement is the same as if the blades were moved forwardly or rearwardly such that their axes of rotation were colinear because it relates to the width of the strip left unworked between adjacent blades facing the same direction. It is preferred to mount the plow points immediately behind the discs with which they cooperate.

Turning now to FIG. 3, there is shown an idealized representation of the soil profile immediately behind the forward set of discs. In FIG. 4, a similar idealized profile is shown representing the soil condition after the rear set of disc/point pairs has worked the soil. A soil profile is a cross section of the soil taken in a vertical plane. The heavier lines 103A and 104A are idealized representations of the upper surface of soil unworked by the discs, and the lighter lines 103B and 104B are idealized representations of the upper surface of soil unworked by the discs, and the lighter lines 103B and 104B are idealized representations of the upper surface of the loose soil resting on the unworked soil.

For convenience of reference, the total swath worked by the plow is divided into adjacent strips designated respectively 100-117 in FIGS. 3 and 4. The forward discs 53A-53H are shown in solid line fragmentary form as viewed from the rear in FIG. 3, and the furrows formed by the tilling action of these discs are the strips 102, 104, 106, 108, 109, 111, 113 and 115 respectively. Similarly, the rear discs 58A-58H are shown in solid line fragmentary form in FIG. 4 (the forward discs being shown in dashed line to indicate the relative placement). The furrows formed by the action of the rear discs are defined by the strips 101, 103, 105, 107, 110, 112, 114 and 116 respectively.

The strip on the left side designated 100, is defined by the distance between the leading edge of the disc 58A and the side dirt shield 49A; and the right side strip 117 is similarly defined.

Referring particularly to FIG. 4, the plow points 68A-68D are located to work in the furrows formed by the respective discs 58A-58D. In this regard, the combination of a rear disc and an associated plow point are sometimes referred to as a "disc/point pair". Similarly, plow points 68E-68H are located respectively behind their associated discs 58E-58H.

When the apparatus is pulled at a high speed in the range indicated, each disc throws the soil and trash that it works a considerable distance to the side. Ideally, the trash and soil are mixed and thrown over the next adjacent strip into the strip worked by the next forward disc of the same set. For example, referring to FIG. 3, the trash and top soil worked by the blade 53B in strip 104 is turned and thrown laterally in the direction of the arrow 120 over the strip 103 into the furrow formed by the blade 53A. In other words, the furrow will already have been formed by the blade 53A at the time soil is being displaced by blade 53B because blade 53A is placed in a forward position. Similarly, on the right side of the forward set of discs, using disc 53F as an example, the mixed soil and trash tilled by it are thrown from strip 111 over strip 112 to fill the furrow in strip 113 formed by blade 53G, as it diagrammatically illustrated by the arrow 121. Obviously not all of the soil displaced by every disc is so neatly placed. Some of it lands on the adjacent strip; but a large portion of worked soil and trash is thrown into the furrow of the next forward disc of the same set, despite the wide spacing of the discs if the machine is properly adjusted. The leading discs 53A, 53H have their soil deflected respectively by the dirt shields 49A, 49B to form windrows shown diagrammatically at 122 and 123 in FIG. 3.

It will be observed that the support wheels 27, 28 are located for placement in strips 105, 112 respectively; and these strips are previously untilled so that not only do the support wheels ride on firm ground, but they do not compact soil that has already been tilled. Rather, the disc/point pairs 58C/68C, 58F/68F are placed to work the soil in the strips 105, 112 respectively after the support wheels have already passed. Referring now to FIG. 5, the relationship between forward and rear blades will be described. The leading edge of the blade 53G (shown in dashed line in the strip 113) is denoted 130. This defines the point at which the leading edge of the blade enters the soil. The corresponding point at which the leading edge of blade 58F (on the rear set) is designated 131.

It will be observed from FIG. 5 that these points 130, 131 overlap in the sense that the point 130 is located to the left of the line 132 which is an idealized representation of the boundary between strips 112 and 113. Similarly, the point 131 actually is located in the strip 113. This overlap is preferably in the range of ½ to 2 inches for large discs of the type preferably used in the present invention, and the reason for this is that the leading edges of the discs actually accomplish a cutting action, rather than a fracturing or scooping action, and by overlapping the leading edges of an associated pair of discs, one on the forward set and one on the rear set, the crossover point of the two cutting edges, designated 136, occurs below the idealized soil level line (shown in chain line 137). Actually, because of the weakened condition of the furrow at this location (caused by the fact that the furrow in strip 112 has already been formed thereby loosening or weakening the soil at the furrow wall) when the rear blade 50F works in strip 112, there will be some fracturing of the soil as indicated by the dashed line 138.

Whereas the leading edges of the discs accomplish more of a shearing action, the trailing edges (that is, where the discs evolve from the furrow) accomplishes a lateral scooping or shoveling effect (refer to the dashed line 139 in FIG. 3 and compare it to the actual contour of the associated disc 53G). This shoveling effect is even more pronounced for the rear set of discs because the lateral force is being exerted on soil already weakened by the action of the associated forward disc. For example, referring to FIG. 5, after the forward disc 53G has formed a furrow in strip 113, the trailing edge of disc 58G will exert a leftward force on the soil in the location designated 140 which already had been weakened by formation of the furrow in strip 113. Hence, the actual soil fracture line between the furrows 113 and 114 is shown in idealized form by the dashed line 141.

The discs work the soil at a depth of about four to five inches, whereas the plow points work the soil at a depth of about seven to fifteen inches, or three to ten inches beneath the working depth of the disc immediately in front of it. Whereas the soil worked by a disc is displaced laterally, the plow points perform two additional functions. First, they fracture, lift and turn soil in an area represented by the line 145, 146 for the plow point 68F. Because of the shape and inclination of the wings on the plow point, the soil that is lifted is twisted and turned in a rowing motion, but not thrown laterally to any substantial degree. At the time a plow tip works a furrow, the furrow will have been substantially cleared by the associated disc, so the plow point works deeper soil, breaking it into clods, twisting and turning it and replacing it in substantially the same area. These large clods, in turn, are covered by the more pulverized soil and trash from the following disc. In this case, the disc 58G throws mixed topsoil and trash, partially burying the trash, and covering the clods turned up by the plow point 68F.

The second function of the plow points is that they loosen and break deep soil along a line indicated by the dashed line 150 between the points 68F and 68G. The soil in the area 151 is not upturned, but it is fractured, creating cracks and fissures in which water can enter and be stored.

The raising of deep soil by the plow points has the advantage of reducing herbicide build up which might otherwise occur if only the discs were employed, without the plow points. If it is desired that a lesser amount of deep soil be raised, conventional V-chisel plow points may be substituted for the plow points that have been illustrated. The raker blades 67, 66, may have smaller diameters than the tillage discs (although this is not necessarily so since they are mounted for independent vertical adjustment). The raker blades are set at approximately ground level (see FIG. 4). These blades simply shovel the windrows 122, 123 into the furrows behind the disc/point pairs which include the outboard plow points 68A and 68H respectively. As mentioned, since the loose soil thrown by the raker blades to fill the adjacent furrows behind the tillage discs 58A and 58H need not be thrown as far as that thrown by the tillage discs, the working angle of the raker blades is adjusted by means of the structure described, depending on soil conditions, blade sizes, spacings, etc., to fill those furrows as best as can be done.

Thus, the present system provides a complete working of the top soil by discs in a single pass and without substantial double working, together with raising at least some deep soil while fracturing and rendering more absorbent much of the soil beneath the working level of the discs. This enhances retention of water, and also reduces water runoff by providing as finished soil profile which is substantially free of furrows and ridges.

One advantage of the present invention can now be appreciated; and that is that by mounting the discs widely apart as described, the weight per disc increases to increase penetration by the discs. Further, by mounting the points on the main frame, they cooperate with the weight of the frame to dig down into the soil as they are pulled forward and partly overcome the tendency of the discs to ride on top of the soil. Thus, this apparatus has greater soil penetration for varying soil and moisture conditions, and therefore provides more uniform results.

The advantages of using widely spaced discs will also be appreciated because the wide spacing reduces the tendency of crop residue or trash to plug the blades, as is the case with closely spaced discs. Further, there is no necessity to provide scrapers of the type normally associated with discs of disc tillers or disc harrows. Still further, the wide spacing of disc permits complete, but not double coverage while neutralizing lateral draft. The wide spacing of discs and placing the points at the rear reduces the pulverization of soil experienced in some disc harrows particularly at the high speeds at which this machine is intended to operate.

The use of the plow points provides the water retention troughs beneath the broken soil; and they also bring up a selected amount of deep soil to prevent herbicide build up in these troughs. It will be appreciated that if the same apparatus is used for tillage the next time it is required, the possibility that the plow tips would be working in the identical areas is highly unlikely so that a repeated use of the apparatus would not have the tendency to form a compacted plow sole that a moldboard plow has with its uniform working depth.

It will also be appreciated that the support wheels 27, 28 run in strips 105, 112 which are solid ground, and they do not work in furrows. The discs 58C, 58F are placed in these strips respectively so that the results of wheel compaction are minimized after the soil is worked by this apparatus.

Having thus disclosed in detail a preferred embodiment of the invention, persons skilled in the art will be able to modify certain of the structure which has been illustrated and substitute equivalent elements for those disclosed while continuing to practice the principle of the invention. It is therefore, intended that all such modifications and substitutions be covered as they are embraced within the spirit and scope of the appended claims.

I claim:

1. Improvements in agricultural tillage apparatus comprising: a main frame defining a longitudinal center line extending in the direction of travel; support wheel means for supporting said main frame, first subframe means extending laterally on each side of said center line substantially equal distances and including a first plurality of ground-engaging tools spaced laterally of each other along said first subframe; second subframe means extending laterally of said center line and including a second plurality of ground-engaging tools spaced laterally of each other along said second subframe; first mounting means including a first hydraulic cylinder unit for mounting said first subframe means to said main frame means and for adjusting the height of said first subframe relative to said main frame means; second mounting means including a second hydraulic cylinder unit for mounting said second subframe means to said main frame for adjusting the height of said second subframe means relative to said main frame; hydraulic conduit means for coupling one of the respective corresponding rod and butt ends of said first and second hydraulic cylinder units together; second hydraulic conduit means for coupling the other ends of said first and second hydraulic cylinder units respectively to the input and output of reversible hydraulic pressure source means; and first and second hydraulic cylinder units being constructed and arranged to adjust the height of said first and second subframe means respectively relative to said main frame means by predetermined amounts for a given displacement of hydraulic fluid from one of said cylinder units to the other by means of said first conduit means.

2. The apparatus of claim 1 wherein said first and second subframes are each mounted to said main frame independently for parallel movement relative to said main frame.

3. The apparatus of claim 1 further comprising third hydraulic cylinder unit means for adjusting the height of said main frame relative to said support wheel means.

4. The apparatus of claim 1 characterized in that said first and second subframe means are adjusted in equal amounts and in unison relative to said main frame.

5. The apparatus of claim 1 wherein each of said first and second mounting means includes rock shaft means extending transverse of said apparatus; said first and second cylinder units being connected in hydraulic circuit with one another such that when one cylinder unit is extended it rotates its associated rock shaft means in one direction and the other cylinder unit rotates its associated rock shaft means in the same direction.

6. The apparatus of claim 1 wherein said hydraulic cylinders are of equal bore size and length.

7. The apparatus of claim 1 wherein each of said first and second mounting means comprises a rock shaft extending transverse of the direction of travel of said vehicle, said first and second hydraulic cylinders being associated respectively with said rock shafts for actuating the same in like rotations.

8. The apparatus of claim 7 wherein each of said first and second subframes extends laterally and symmetrically relative to the horizontal center line of said apparatus and wherein said tools of each of said subframes are placed symmetrically relative to said center line.

* * * * *